US012631909B2

(12) United States Patent
Liang et al.

(10) Patent No.: US 12,631,909 B2
(45) Date of Patent: May 19, 2026

(54) THERMO-OPTIC PHASE MODULATION MODULE AND OPTICAL MODULATOR

(71) Applicant: NANJING LYCORE TECHNOLOGIES CO., LTD., Nanjing (CN)

(72) Inventors: Hanxiao Liang, Suzhou (CN); Yipin Song, Suzhou (CN); Yingcong Zhou, Suzhou (CN); Haicang Wu, Suzhou (CN); Wenhao Mao, Suzhou (CN); Shiwei Song, Suzhou (CN); Weiqi Sun, Suzhou (CN); Qingyang Yu, Suzhou (CN)

(73) Assignee: NANJING LYCORE TECHNOLOGIES CO., LTD., Nanjing (CN)

( * ) Notice: Subject to any disclaimer, the term of this patent is extended or adjusted under 35 U.S.C. 154(b) by 311 days.

(21) Appl. No.: 18/573,933

(22) PCT Filed: Apr. 20, 2022

(86) PCT No.: PCT/CN2022/087989
§ 371 (c)(1),
(2) Date: Dec. 22, 2023

(87) PCT Pub. No.: WO2023/273534
PCT Pub. Date: Jan. 5, 2023

(65) Prior Publication Data
US 2024/0210741 A1      Jun. 27, 2024

(30) Foreign Application Priority Data
Jun. 28, 2021    (CN) .......................... 202110721893.9

(51) Int. Cl.
*G02F 1/01*          (2006.01)

(52) U.S. Cl.
CPC ............ *G02F 1/0147* (2013.01); *G02F 1/011* (2013.01)

(58) Field of Classification Search
CPC .................................................... G02F 1/0147
See application file for complete search history.

(56) References Cited

U.S. PATENT DOCUMENTS

| 2002/0094186 A1* | 7/2002 | Wu .......................... G02F 1/025 |
| | | 385/140 |
| 2005/0169566 A1 | 8/2005 | Takahashi |
| 2009/0297092 A1 | 12/2009 | Takahashi |

FOREIGN PATENT DOCUMENTS

| CN | 1659469 | 8/2005 |
| CN | 101529312 | 9/2009 |

(Continued)

OTHER PUBLICATIONS

Office Action in Japanese Appln. No. 2023-579863, mailed on Jul. 11, 2025, 10 pages (with English translation).

(Continued)

*Primary Examiner* — Lisa M Caputo
(74) *Attorney, Agent, or Firm* — Fish & Richardson P.C.

(57) ABSTRACT

A thermo-optic phase modulation module and an optical modulator are provided. The thermo-optic phase modulation module includes: a substrate; an isolation layer located on substrate; a first waveguide located on isolation layer; and at least one heating element located on the isolation layer and not overlapping with the first waveguide in a direction perpendicular to a bottom surface of the substrate. The thermo-optic phase modulation module is provided with a plurality of side heat insulation grooves extending downwardly from a top surface and exposing the substrate, and (Continued)

the plurality of side heat insulation grooves are arranged around the first waveguide and the at least one heating element.

16 Claims, 8 Drawing Sheets

(56)                    References Cited

FOREIGN PATENT DOCUMENTS

| | | | | |
|---|---|---|---|---|
| CN | 101796442 | 8/2010 | | |
| CN | 111367097 A | 7/2020 | | |
| CN | 112305785 | 2/2021 | | |
| CN | 112462534 | 3/2021 | | |
| CN | 113359328 | 9/2021 | | |
| JP | 2000-056278 | 2/2000 | | |
| JP | 2006058858 A | 3/2006 | | |
| JP | 2006-235379 | 9/2006 | | |
| JP | 2007-025583 | 2/2017 | | |
| JP | 2018-200388 A | 12/2018 | | |
| WO | WO-0231555 A2 * | 4/2002 | ............ | G02F 1/025 |
| WO | WO 2008047634 A1 | 4/2008 | | |

OTHER PUBLICATIONS

Office Action in Japanese Appln. No. 2023-579863, mailed on Feb. 21, 2025, 9 pages.
Extended European Search Report in European Application No. 22831365.6, mailed on Sep. 16, 2024, 7 pages.
Office Action in Japanese Application No. 2023-579863, drafted Sep. 25, 2024, with Search Report drafted Sep. 12, 2024, total 44 pages (with English translation).

* cited by examiner

THERMO-OPTIC PHASE MODULATION MODULE AND OPTICAL MODULATOR

CROSS-REFERENCE TO RELATED APPLICATIONS

The present application is a national stage filing under 35 U.S.C. § 371 of International Application No. PCT/CN2022/087989, filed on Apr. 20, 2022, which claims priority to Chinese patent application No. 202110721893.9, filed on Jun. 28, 2021. The contents of these applications are incorporated herein by reference in their entirety.

TECHNICAL FIELD

The present disclosure relates to the technical field of optical communications, and in particular, to a thermo-optic phase modulation module and an optical modulator.

BACKGROUND

Optical communication has rapidly developed into a major form of information transmission due to its advantages such as wide frequency band and large capacity. To realize optical communication, light modulation and demodulation must be carried out.

A phase modulator is a device that modulates the phase of an output optical signal, and may comprise one or more phase modulation modules. Based on different modulation mechanisms, the phase modulation module may be, for example, an electro-optic phase modulation module based on the electro-optic effect or a thermo-optic phase modulation module based on the thermo-optic effect. The electro-optic phase modulation module has a relatively fast modulation speed, but its phase modulation range is small, resulting in limited applications. Moreover, the heat generated due to large current injection will reduce the electro-optic modulation efficiency. It is very suitable for the thermo-optic phase modulation module to be made of a material with a large thermo-optic coefficient and a large thermal conductivity, and the thermo-optic phase modulation module has a relatively slow modulation speed, and has the advantages of large phase modulation range and high modulation efficiency.

How to improve the modulation efficiency of thermo-optic phase modulation modules is an urgent technical problem that needs to be solved currently.

SUMMARY

According to an aspect of the present disclosure, provided is a thermo-optic phase modulation module, comprising: a substrate; an isolation layer located on the substrate; a first waveguide located on the isolation layer; and at least one heating element located on the isolation layer and not overlapping with the first waveguide in a direction perpendicular to a bottom surface of the substrate; wherein the thermo-optic phase modulation module is provided with a plurality of side heat insulation grooves extending downwardly from a top surface and exposing the substrate, and the plurality of side heat insulation grooves are arranged around the first waveguide and the at least one heating element.

According to an aspect of the present disclosure, provided is an optical modulator, comprising a thermo-optic phase modulation module according to any one of the technical solutions described above.

It should be understood that the content described in this section is not intended to identify critical or important features of the embodiments of the present disclosure, and is not used to limit the scope of the present disclosure. Other features of the present disclosure will be easily understood through the following description.

BRIEF DESCRIPTION OF THE DRAWINGS

More details, features, and advantages of the present disclosure are disclosed in the following description of example embodiments with reference to the accompany drawings, in which.

DETAILED DESCRIPTION

Figure 1:
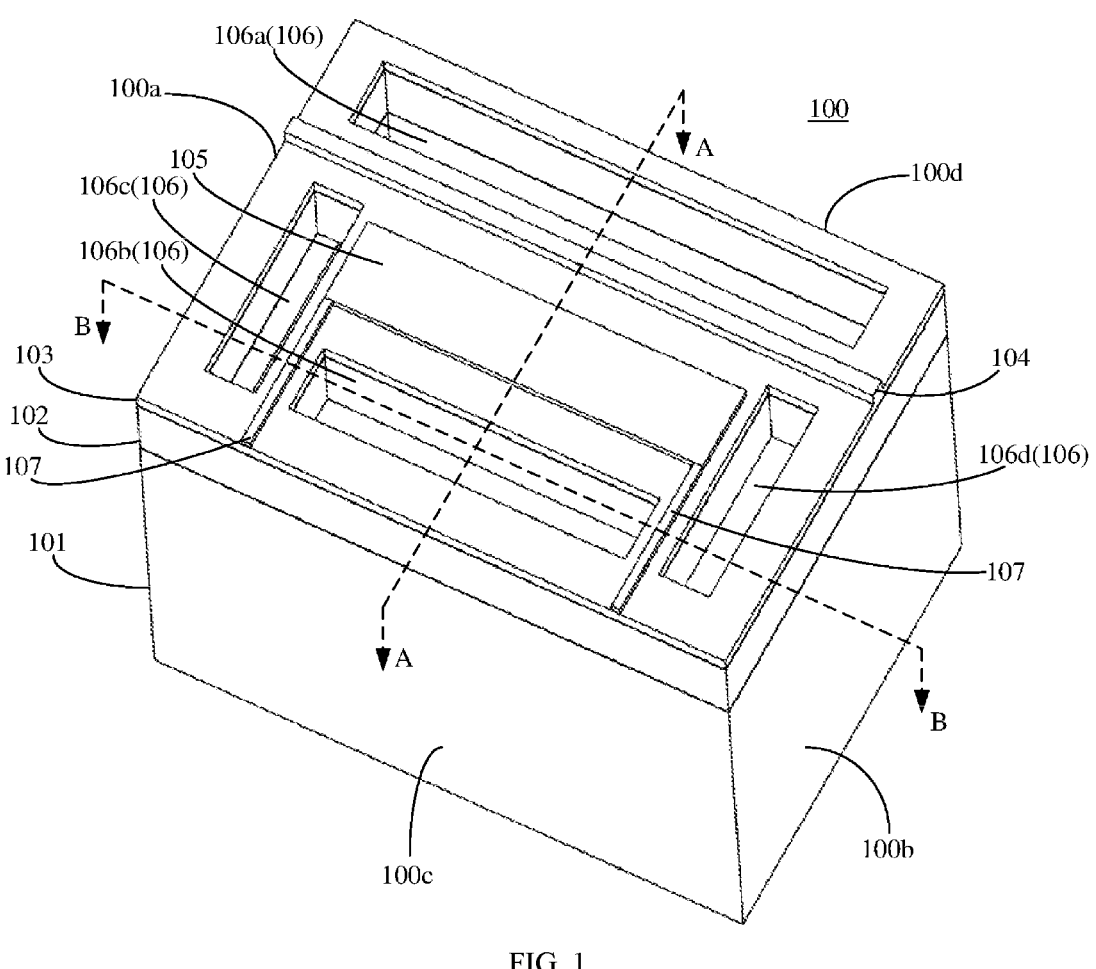
FIG. 1 is a schematic perspective view of a thermo-optic phase modulation module according to some embodiments of the present disclosure.

Only some example embodiments are briefly described below. As can be appreciated by those skilled in the art, the described embodiments can be modified in various ways without departing from the spirit or scope of the present disclosure. Accordingly, the accompanying drawings and the description are considered as illustrative in nature, and not as restrictive.

The inventors of the present disclosure have appreciated that the modulation efficiency of thermo-optic phase modulation modules in the related art is still not ideal due to large heat loss, and the improvement of the modulation efficiency of optical modulators is thus also limited.

Based on this, embodiments of the present disclosure provide a thermo-optic phase modulation module and an optical modulator to improve the modulation efficiency of the thermo-optic phase modulation module and in turn improve the modulation efficiency of the optical modulator.

As shown in FIGS. 1, 2, 3 and 4, a thermo-optic phase modulation module 100 according to some embodiments of the present disclosure comprises: a substrate 101; an isolation layer 102 located on the substrate 101; a first waveguide 104 located on the isolation layer 102; and at least one heating element 105 (in the embodiments of the drawings, shown as comprising one heating element 105) located on the isolation layer 102 and not overlapping with the first waveguide 104 in a direction perpendicular to a bottom surface of the substrate 101. The thermo-optic phase modulation module 100 is provided with a plurality of side heat insulation grooves 106 extending downwardly from a top surface and exposing the substrate 101, and the plurality of side heat insulation grooves 106 are arranged around the first waveguide 104 and the at least one heating element 105.

As shown in FIG. 1, in this embodiment, the thermo-optic phase modulation module 100 further comprises a second waveguide 103. The second waveguide 103 is located between the isolation layer 102 and the first waveguide 104, and is integrally connected to the first waveguide 104 to form a ridge waveguide structure. The ridge waveguide has a series of excellent characteristics such as a low dominant mode cutoff frequency, a wide frequency band and a low impedance, and can have an even better performance when applied to the thermo-optic phase modulation module 100.

In the embodiments of the present disclosure, a side surface of the substrate 101 away from the isolation layer 102 is defined as its bottom surface, and a side surface thereof close to the isolation layer 102 is defined as its upper surface; and a side surface of the thermo-optic phase modulation module 100 away from the bottom surface of the substrate 101 is defined as its top surface.

The basic working principle of the thermo-optic phase modulation module 100 is that the first waveguide 104 is heated by the heating element 105, the temperature of the first waveguide 104 and its surrounding area rises, and the refractive index of the material of the first waveguide 104 will change accordingly, so as to achieve the purpose of modulating the phase of a light field in the waveguide.

The thermo-optic phase modulation module 100 of the embodiments of the present disclosure is provided with a plurality of side heat insulation grooves 106 around the first waveguide 104 and the at least one heating element 105. The plurality of side heat insulation grooves 106 can reduce heat in an enclosed internal area from dissipating to the surrounding environment, so that the heat can be more concentratedly conducted to the first waveguide 104 and the vicinity of the first waveguide 104. Therefore, the heating efficiency of the first waveguide 104 can be improved, thereby improving the modulation efficiency of the thermo-optic phase modulation module 100 based on the principle of thermo-optic effect, and the modulation efficiency of the optical modulator including the thermo-optic phase modulation module 100.

Figure 3:
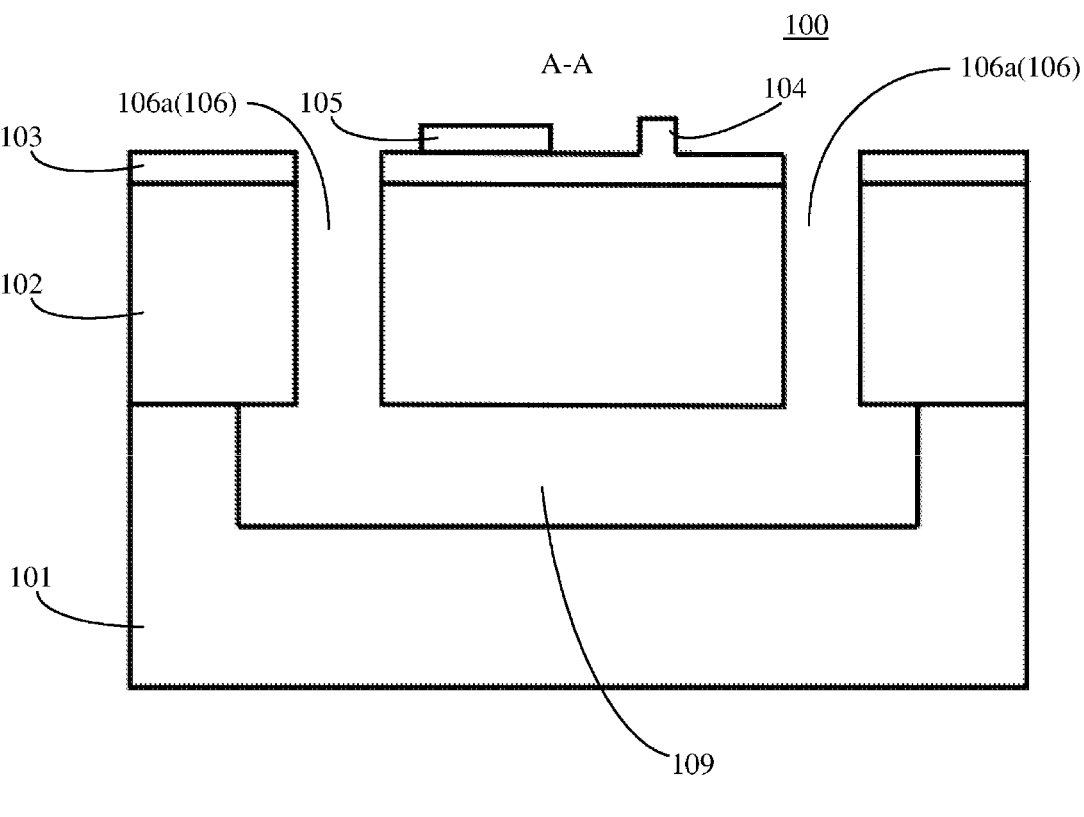
FIG. 3 is a schematic cross-sectional view along A-A in FIG. 1.
Figure 4:
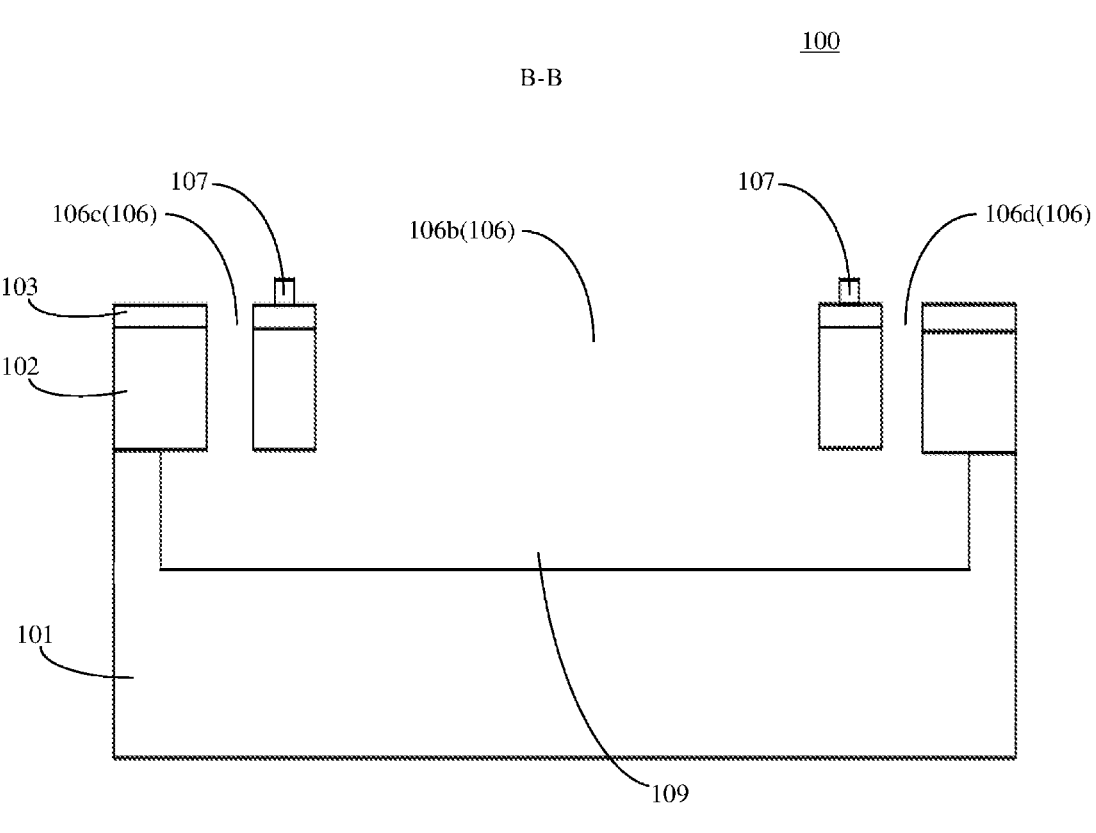
FIG. 4 is a schematic cross-sectional view along B-B in FIG. 1.

As shown in FIGS. 3 and 4, in some embodiments of the present disclosure, a side of the substrate 101 facing the isolation layer 102 is provided with a bottom heat insulation groove 109 for communicating bottom portions of the plurality of side heat insulation grooves 106 with each other. After the bottom heat insulation groove 109 is in communication with the plurality of side heat insulation grooves 106, a three-dimensional partition space is formed, which can not only reduce the heat dissipation from side surfaces of the thermo-optic phase modulation module 100, but can also reduce the heat dissipation from a bottom portion of thermo-optic phase modulation module 100, thereby further improving the heating efficiency of the first waveguide 104 and making the modulation efficiency of the thermo-optic phase modulation module 100 better.

Figure 5:
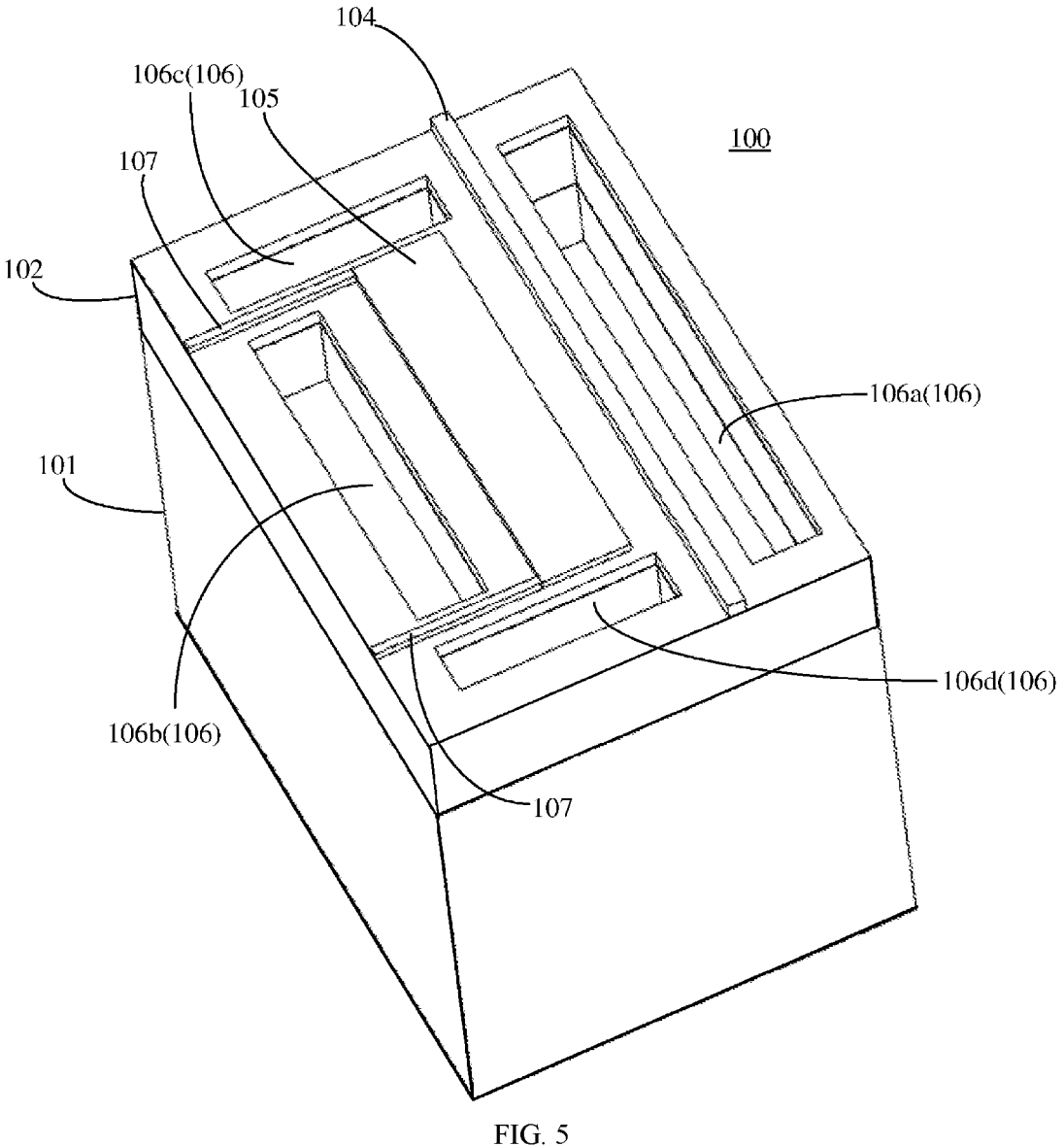
FIG. 5 is a schematic perspective view of a thermo-optic phase modulation module according to some embodiments of the present disclosure.

The embodiments of the present disclosure are not limited to the use of the ridge waveguide structure shown in FIG. 1. As shown in FIG. 5, a thermo-optic phase modulation module 100 may not comprise the second waveguide 103 in FIG. 1, but may still be equipped with the heating element 105, etc. to realize the phase modulation function based on the principle of thermo-optic effect.

As shown in FIG. 1, the thermo-optic phase modulation module 100 comprises a first end face 100a and a second end face 100b arranged opposite to each other, and a third end face 100c and a fourth end face 100d arranged opposite to each other. The first waveguide 104 extends to the first end face 100a and the second end face 100b. The first end face 100a may be used as an input-side end face of the thermo-optic phase modulation module 100, and the second end face 100b as an output-side end face of the thermo-optic phase modulation module 100. Alternatively, the second end face 100b may be used as an input-side end face of the thermo-optic phase modulation module 100, and the first end face 100a as an output-side end face of the thermo-optic phase modulation module 100. The specific shape of the first waveguide 104 is not defined, and is not limited to the constant-width strip waveguide shown in the figures. The first waveguide may also be designed into other shapes according to the modulation requirements of the spot size. For example, at least a part of the first waveguide has a shape with increasing or decreasing width along its extension direction.

Figure 6:
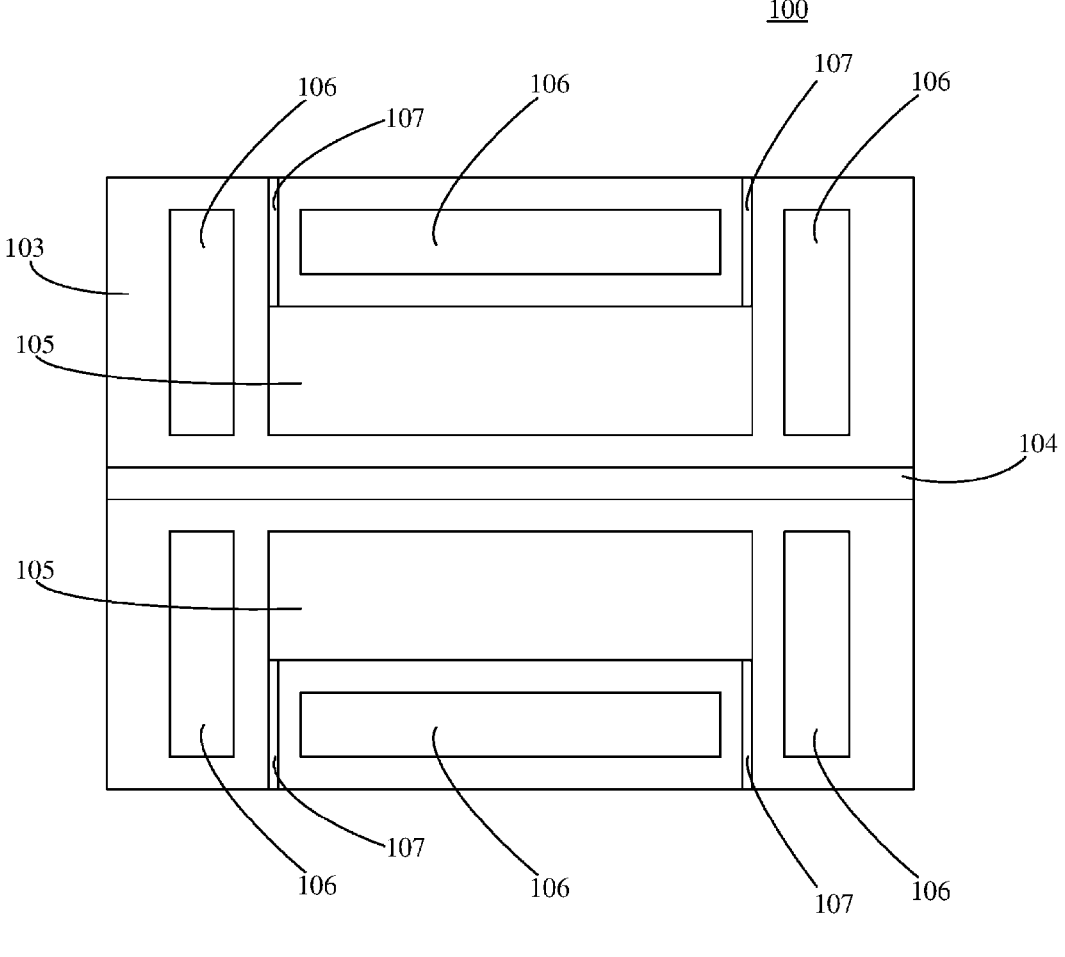
FIG. 6 is a schematic top view of a thermo-optic phase modulation module according to some embodiments of the present disclosure.

In the embodiments of the present disclosure, the number of heating elements 105 is not limited and may be one or more. As shown in FIG. 1, there is one heating element 105. As shown in FIG. 6, when there are a plurality of heating elements 105 (specifically two in this embodiment), the plurality of heating elements 105 are distributed on two sides of the first waveguide 104 when viewed from a top view. That is, orthographic projections of the plurality of heating elements 105 onto the bottom surface of the substrate 101 are distributed on two sides of an orthographic projection of the first waveguide 104 onto the bottom surface of the substrate 101. The plurality of side heat insulation grooves 106 are arranged around the first waveguide 104 and the plurality of heating elements 105.

The plurality of heating elements 105 may be arranged on two sides or one side of the first waveguide 104 according to requirements, so as to heat the first waveguide 104 from both sides or one side of the first waveguide 104. The number and arrangement of side heat insulation grooves 106 are not limited. When there are a plurality of heating elements 105, the plurality of side heat insulation grooves 106 are arranged around the first waveguide 104 and the plurality of heating elements 105 to minimize the heat dissipation.

Figure 2:
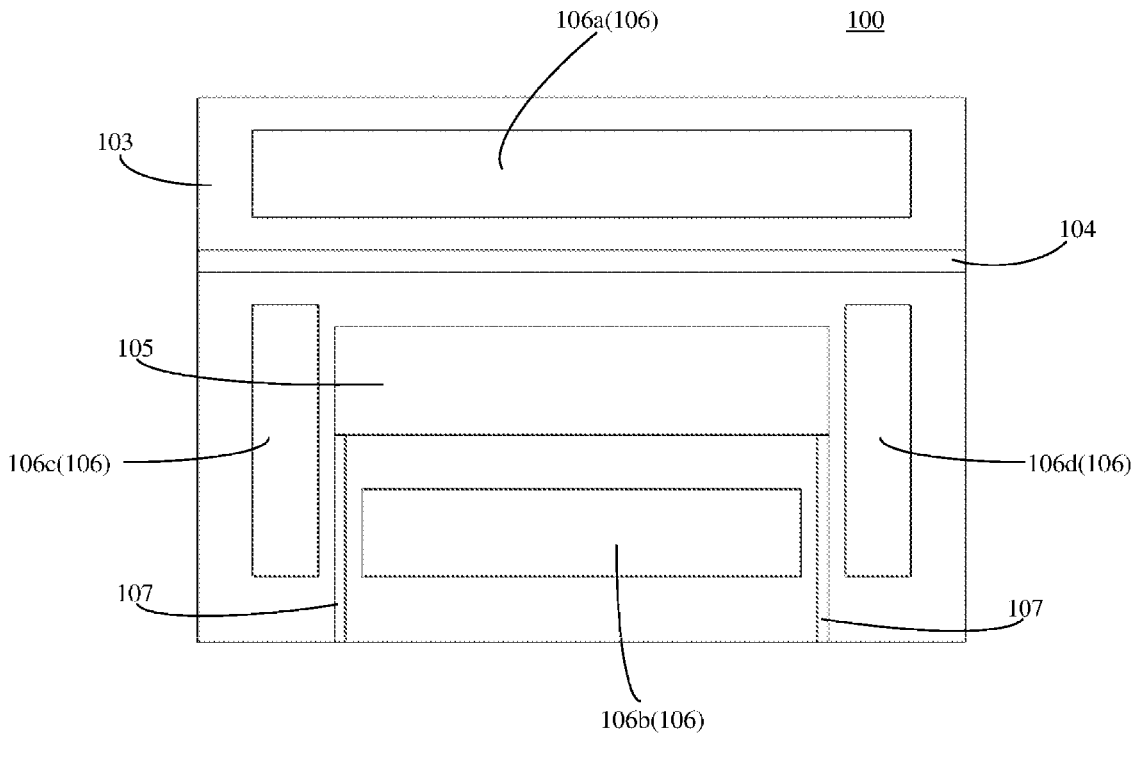
FIG. 2 is a schematic top view of a thermo-optic phase modulation module according to some embodiments of the present disclosure.

In the present disclosure, the specific numbers, specific shapes and specific positions of the heating elements 105 and the side heat insulation grooves are not particularly limited. As shown in FIG. 2, in some embodiments of the present disclosure, there is one heating element 105, its orthographic projection onto the bottom surface of the substrate 101 is rectangular, the orthographic projection of each side heat insulation groove 106 onto the bottom surface of the substrate 101 is also rectangular, and there are four side heat insulation grooves 106, namely a first side heat insulation groove 106a, a second side heat insulation groove 106b, a third side heat insulation groove 106c and a fourth side heat insulation groove 106d. A long side of the orthographic projection of the heating element 105 onto the bottom surface of the substrate 101, a long side of the orthographic projection of the first side heat insulation groove 106a onto the bottom surface of the substrate 101, and a long side of the orthographic projection of the second side heat insulation groove 106b onto the bottom surface of the substrate 101 are substantially parallel to an extension direction of the first waveguide 104; and a long side of the orthographic projection of the third side heat insulation groove 106c onto the bottom surface of the substrate 101 and a long side of the orthographic projection of the fourth side heat insulation groove 106*d* onto the bottom surface of the substrate 101 are substantially orthogonal to the extension direction of the first waveguide 104. Here, "substantially parallel" means that within a certain error range, the two are considered to be parallel to each other. Similarly, "substantially orthogonal" means that within a certain error range, the two are considered to be orthogonal to each other. This arrangement has a relatively compact structure, and facilitates reducing the size of the thermo-optic phase modulation module 100.

In the embodiments of the present disclosure, it is not limited that the downward extension direction of each side heat insulation groove 106 must be perpendicular to the bottom surface of the substrate 101. For example, each side heat insulation groove 106 may be at a certain inclination angle relative to the bottom surface of the substrate 101, and can still effectively function to reduce the heat dissipation. In some embodiments, each side heat insulation groove 106 is formed by using an etching process, and its wall surface presents a certain etching inclination angle relative to the bottom surface of the substrate 101, so that a longitudinal cross-section of the side heat insulation groove 106 perpendicular to a length direction thereof has an inverted trapezoid shape as a whole.

In the embodiments of the present disclosure, the specific type of the heating element 105 is not limited. For example, the heating element may be a metal heating element (such as a thin film resistor made of a nickel-chromium alloy), a ceramic heating element, a nanomaterial heating element, a microcrystalline heating element, an infrared heating element, etc.

In some embodiments of the present disclosure, as shown in FIGS. 1 and 2, the thermo-optic phase modulation module 100 further comprises: a plurality of wires 107 connected to the at least one heating element 105, located on the isolation layer 102, and overlapping with none of the first waveguide 104 and the plurality of side heat insulation grooves 106 in the direction perpendicular to the bottom surface of substrate 101. The plurality of wires 107 may extend to the third end face and/or the fourth end face according to requirements, as long as they avoid the first waveguide 104 and each side heat insulation groove 106. As shown in FIG. 1, in this embodiment, there is one heating element 105, which is connected to two wires 107, and the two wires 107 extend to the third end face. When the heating element 105 is operating, the two wires 107 are respectively connected to positive and negative terminals of a power supply. The wires 107 may be made of a metal with a better conductivity, such as gold, copper, and aluminum.

Figure 7:
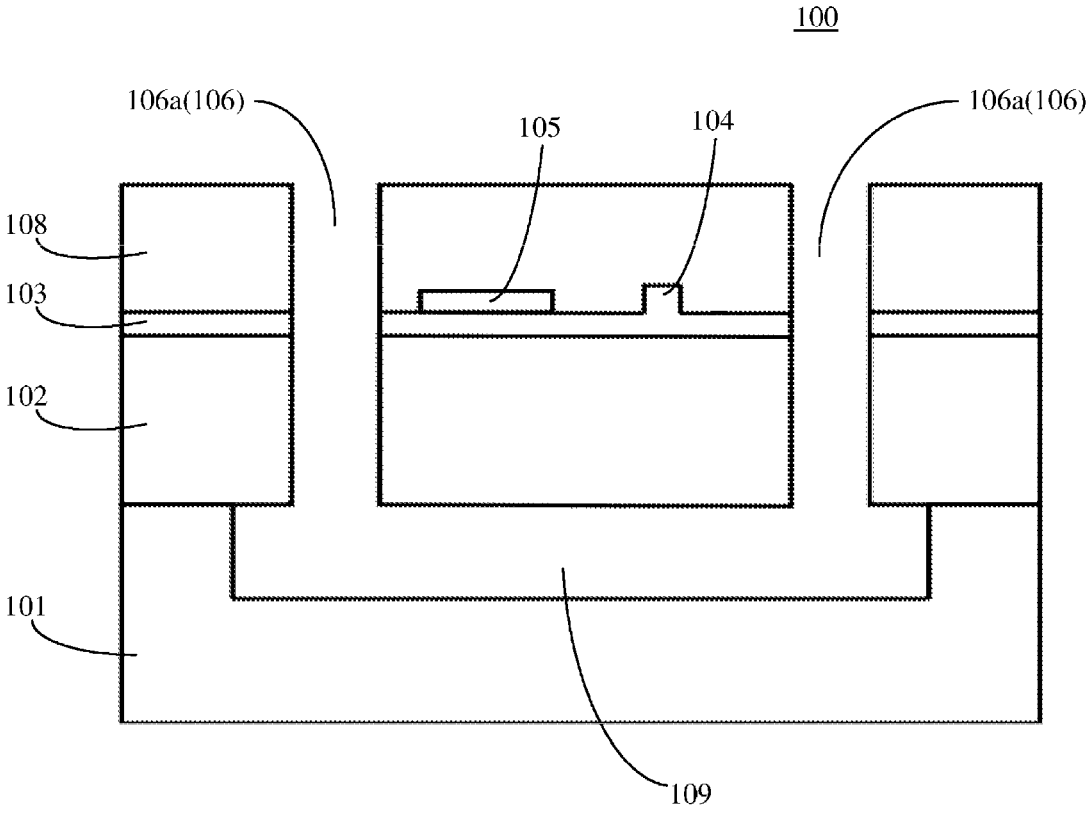
FIG. 7 is a cross-sectional view of a thermo-optic phase modulation module according to some embodiments of the present disclosure, taken along a plane parallel to a first end face.
Figure 8:
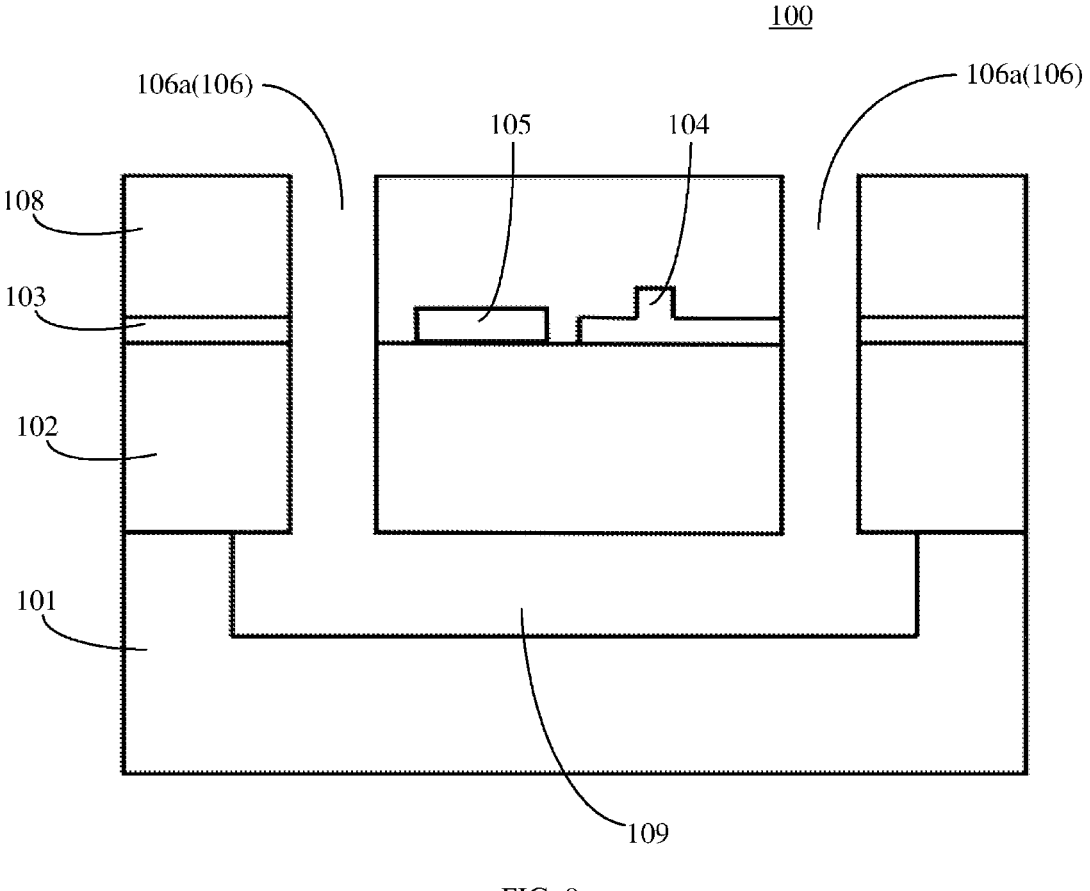
FIG. 8 is a cross-sectional view of a thermo-optic phase modulation module according to some embodiments of the present disclosure, taken along a plane parallel to a first end face.

As shown in FIG. 7, in some embodiments of the present disclosure, the heating element 105 is formed on an upper surface of the second waveguide 103. As shown in FIG. 8, in some other embodiments of the present disclosure, the heating element 105 may be formed on an upper surface of the isolation layer 102 and does not overlap with the second waveguide 103 in the direction perpendicular to the bottom surface of the substrate 101. In these embodiments, the heating element 105 may transfer heat to the first waveguide 104 indirectly.

In some embodiments of the present disclosure, as shown in FIGS. 7 and 8, the thermo-optic phase modulation module 100 further comprises a covering layer 108. The covering layer 108 covers the first waveguide 104 and the at least one heating element 105. In addition, the covering layer 108 may also cover the wire 107 or a part of the wire 107. In one embodiment, the covering layer 108 entirely covers the second waveguide 103, the first waveguide 104, the heating element 105 and the wire 107. It can be understood that the plurality of side heat insulation grooves 106 penetrate downwardly through the covering layer 108.

In some embodiments of the present disclosure, the first waveguide 104 and the second waveguide 103 are made of the same material, and thus have the same refractive index defined as n1, a refractive index of the covering layer 108 is defined as n2, and a refractive index of the isolation layer 102 is defined as n3. In some embodiments, the refractive indexes of the above layers satisfy: n1>n2, and n1>n3. The refractive index of the isolation layer 102 and the refractive index of the covering layer 108 are less than that of the first waveguide 104 and the second waveguide 103, so that light can be mainly confined to transmitting in the ridge waveguide to achieve the above advantages of the ridge waveguide.

In the embodiments of the present disclosure, the material of each layer of the thermo-optic phase modulation module 100 is not specifically limited. For example, the main material of the substrate 101 may be silicon, the main material of the isolation layer 102 may be silicon dioxide, the main material of the covering layer 108 may be silicon dioxide, and the main material of the first waveguide 104 and the second waveguide 103 may be lithium niobate, silicon dioxide, polymer, etc.

An embodiment of the present disclosure also provides an optical modulator, comprising a thermo-optic phase modulation module 100 according to any one of the foregoing embodiments. The specific product type of the optical modulator is not limited, for example, it may be an electro-optic modulator, an acousto-optic modulator, a magneto-optic modulator, an electro-absorption modulator, etc. The thermo-optic phase modulation module 100 of the embodiments of the present disclosure may be used as a bias modulation module in the optical modulator, and jointly achieve modulation of light with other phase modulation modules.

Since the thermo-optic phase modulation module 100 has a high modulation efficiency based on the principle of thermo-optic effect, the modulation efficiency of the optical modulator including the thermo-optic phase modulation module 100 is also high.

As used herein, the term "substrate" may refer to a substrate of a cut wafer, or may refer to a substrate of an uncut wafer. It should be understood that the term "layer" includes films and should not be construed as indicating vertical or horizontal thickness unless otherwise specified.

It should be understood that, in this description, the orientations or positional relationships or dimensions denoted by the terms, such as "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial" and "circumferential", are the orientations or positional relationships or dimensions shown on the basis of the accompanying drawings, and these terms are used merely for ease of description, rather than indicating or implying that the apparatus or element referred to must have particular orientations and be constructed and operated in the particular orientations, and therefore should not be construed as limiting the scope of protection of the present disclosure.

In addition, the terms "first", "second" and "third" are merely for descriptive purposes and should not be construed as indicating or implying relative importance or implicitly indicating the number of technical features indicated. Thus, the features defined with "first", "second" and "third" may explicitly or implicitly comprise one or more features. In the description of the present disclosure, the term "a plurality of" means two or more, unless otherwise explicitly and specifically defined.

In the present disclosure, unless expressly stated or defined otherwise, the terms such as "mounting", "connection", "connected" and "fixing" should be interpreted broadly, for example, they may be a fixed connection, a detachable connection, or an integrated connection; may be mechanical connection, or electrical connection, or communication; and may be a direct connection or an indirect connection by means of an intermediate medium, or may be internal communication between two elements or interaction between the two elements. For those of ordinary skill in the art, the specific meanings of the above terms in the present disclosure can be understood according to specific circumstances.

In the present disclosure, unless expressly stated or limited otherwise, the expression of the first feature being "above" or "below" the second feature may comprise the case that the first feature is in direct contact with the second feature, and may also comprise the case that the first feature and the second feature are not in direct contact but are contacted via another feature therebetween. Furthermore, the first feature being "over", "above" or "on" the second feature comprises the case that the first feature is directly or obliquely above the second feature, or merely indicates that the first feature is at a higher level than the second feature. The first feature being "below", "under" or "beneath" the second feature comprises the case that the first feature is directly or obliquely below the second feature, or merely indicates that the first feature is at a lower level than the second feature.

This description provides many different implementations or examples that can be used to implement the present disclosure. It should be understood that these different implementations or examples are purely illustrative and are not intended to limit the scope of protection of the present disclosure in any way. On the basis of the disclosure of the description of the present disclosure, those skilled in the art will be able to conceive of various changes or substitutions. All these changes or substitutions shall fall within the scope of protection of the present disclosure. Therefore, the scope of protection of the present disclosure shall be subject to the scope of protection of the claims.

What is claimed is:

1. A thermo-optic phase modulation module, comprising:
a substrate;
an isolation layer located on the substrate;
a first waveguide located on the isolation layer;
at least one heating element located on the isolation layer and not overlapping with the first waveguide in a direction perpendicular to a bottom surface of the substrate; and
a plurality of wires connected to the at least one heating element, wherein the at least one heating element is located on the isolation layer and overlaps with none of the first waveguide and a plurality of side heat insulation grooves in the direction perpendicular to the bottom surface of the substrate;
wherein the thermo-optic phase modulation module is provided with the plurality of side heat insulation grooves extending downwardly from a top surface and exposing the substrate, and the plurality of side heat insulation grooves are arranged around the first waveguide and the at least one heating element, wherein the thermo-optic phase modulation module comprises a first end face and a second end face arranged opposite to each other, and a third end face and a fourth end face arranged opposite to each other, wherein the first waveguide extends to the first end face and the second end face, and the plurality of wires extend to at least one of the third end face or the fourth end face.

2. The thermo-optic phase modulation module according to claim 1, further comprising:
a second waveguide located between the isolation layer and the first waveguide, and integrally connected to the first waveguide to form a ridge waveguide structure.

3. The thermo-optic phase modulation module according to claim 2, wherein
the at least one heating element is formed on an upper surface of the isolation layer and does not overlap with the second waveguide in the direction perpendicular to the bottom surface of the substrate.

4. The thermo-optic phase modulation module according to claim 2, wherein
the at least one heating element is formed on an upper surface of the second waveguide.

5. The thermo-optic phase modulation module according to claim 1, further comprising:
a covering layer for covering the first waveguide and the at least one heating element.

6. The thermo-optic phase modulation module according to claim 1, wherein
a side of the substrate facing the isolation layer is provided with a bottom heat insulation groove for communicating bottom portions of the plurality of side heat insulation grooves with each other.

7. The thermo-optic phase modulation module according to claim 6, wherein
the at least one heating element comprises one heating element, an orthographic projection of the one heating element onto the bottom surface of the substrate being rectangular, and an orthographic projection of each side heat insulation groove of the plurality of side heat insulation grooves onto the bottom surface of the substrate being rectangular, and the plurality of side heat insulation grooves comprise a first side heat insulation groove, a second side heat insulation groove, a third side heat insulation groove and a fourth side heat insulation groove, wherein:
a long side of the orthographic projection of the one heating element onto the bottom surface of the substrate, a long side of the orthographic projection of the first side heat insulation groove onto the bottom surface of the substrate, and a long side of the orthographic projection of the second side heat insulation groove onto the bottom surface of the substrate are substantially parallel to an extension direction of the first waveguide; and
a long side of the orthographic projection of the third side heat insulation groove onto the bottom surface of the substrate and a long side of the orthographic projection of the fourth side heat insulation groove onto the bottom surface of the substrate are substantially orthogonal to the extension direction of the first waveguide.

8. The thermo-optic phase modulation module according to claim 6, wherein
the at least one heating element comprises a plurality of heating elements, and orthographic projections of the plurality of heating elements onto the bottom surface of the substrate are distributed on one side or two sides of an orthographic projection of the first waveguide onto the bottom surface of the substrate.

9. The thermo-optic phase modulation module according to claim 6, wherein the at least one heating element is at least one of a metal heating element, a ceramic heating element, a nanomaterial heating element, a microcrystalline heating element, or an infrared heating element.

10. An optical modulator, comprising: a thermo-optic phase modulation module, wherein the thermo-optic phase modulation module comprises:

a substrate;

an isolation layer located on the substrate;

a first waveguide located on the isolation layer; and at least one heating element located on the isolation layer and not overlapping with the first waveguide in a direction perpendicular to a bottom surface of the substrate; and a plurality of wires connected to the at least one heating element, wherein the at least one heating element is located on the isolation layer and overlaps with none of the first waveguide and a plurality of side heat insulation grooves in the direction perpendicular to the bottom surface of the substrate;

wherein the thermo-optic phase modulation module is provided with plurality of side heat insulation grooves extending downwardly from a top surface and exposing the substrate, and the plurality of side heat insulation grooves are arranged around the first waveguide and the at least one heating element, wherein the thermo-optic phase modulation module comprises a first end face and a second end face arranged opposite to each other, and a third end face and a fourth end face arranged opposite to each other, wherein the first waveguide extends to the first end face and the second end face, and the plurality of wires extend to at least one of the third end face or the fourth end face.

11. The optical modulator according to claim 10, wherein the thermo-optic phase modulation module further comprises:

a second waveguide located between the isolation layer and the first waveguide, and integrally connected to the first waveguide to form a ridge waveguide structure.

12. The optical modulator according to claim 11, wherein the at least one heating element is formed on an upper surface of the isolation layer and does not overlap with the second waveguide in the direction perpendicular to the bottom surface of the substrate.

13. The optical modulator according to claim 11, wherein the at least one heating element is formed on an upper surface of the second waveguide.

14. The optical modulator according to claim 10, wherein the thermo-optic phase modulation module further comprises:

a covering layer for covering the first waveguide and the at least one heating element.

15. The optical modulator according to claim 10, wherein a side of the substrate facing the isolation layer is provided with a bottom heat insulation groove for communicating bottom portions of the plurality of side heat insulation grooves with each other.

16. The optical modulator according to claim 15, wherein the at least one heating element comprises one heating element, an orthographic projection of the one heating element onto the bottom surface of the substrate being rectangular, and an orthographic projection of each side heat insulation groove of the plurality of side heat insulation grooves onto the bottom surface of the substrate being rectangular, and the plurality of side heat insulation grooves comprise a first side heat insulation groove, a second side heat insulation groove, a third side heat insulation groove and a fourth side heat insulation groove, wherein:

a long side of the orthographic projection of the one heating element onto the bottom surface of the substrate, a long side of the orthographic projection of the first side heat insulation groove onto the bottom surface of the substrate, and a long side of the orthographic projection of the second side heat insulation groove onto the bottom surface of the substrate are substantially parallel to an extension direction of the first waveguide; and a long side of the orthographic projection of the third side heat insulation groove onto the bottom surface of the substrate and a long side of the orthographic projection of the fourth side heat insulation groove onto the bottom surface of the substrate are substantially orthogonal to the extension direction of the first waveguide.

* * * * *